United States Patent [19]

Seegers

[11] Patent Number: 5,009,299
[45] Date of Patent: Apr. 23, 1991

[54] CLUTCH ACTUATING DEVICE

[75] Inventor: Hanns Seegers, Herzogenaurach, Fed. Rep. of Germany

[73] Assignee: INA Walzlager Schaeffler KG, Fed. Rep. of Germany

[21] Appl. No.: 472,721

[22] Filed: Jan. 31, 1990

[30] Foreign Application Priority Data

Mar. 8, 1989 [DE] Fed. Rep. of Germany ....... 3907341

[51] Int. Cl.$^5$ .................... F16D 25/02; F16D 25/06
[52] U.S. Cl. ............................ 192/85 C; 192/91 R; 92/62
[58] Field of Search .............. 192/85 C, 91 R, 83, 192/85 V; 92/62; 91/509, 510

[56] References Cited

U.S. PATENT DOCUMENTS

| | | | |
|---|---|---|---|
| 3,171,526 | 3/1965 | Waclawek | 192/85 C X |
| 4,745,999 | 5/1988 | Brugger et al. | 192/85 C X |
| 4,871,051 | 10/1989 | Whitmer | 192/85 C |

FOREIGN PATENT DOCUMENTS 877590 9/1961 United Kingdom .............. 192/85 C

Primary Examiner—Allan D. Herrmann
Assistant Examiner—Andrea Pitts
Attorney, Agent, or Firm—Bierman and Muserlian

[57] ABSTRACT

A clutch actuating device in which an actuating piston coupled via actuating members with a clutch release bearing and, at an axial distance to this, a compensating piston are longitudinally displaceably guided in a hollow cylindrical housing, which pistons are held at a distance by a pressure spring and together with a section of the cylinder wall of the housing delimit an actuating oil chamber connected to an external oil reservoir, characterized in that the compensating piston with its side opposed to the actuating piston delimits a compensating oil chamber formed by the bore wall and the housing bottom, the actuating oil chamber and the compensating oil chamber being connected by an oil passage which is regulated both as a function of the distance between the pistons and of the operational state, the actuating oil chamber being connected with a pressure oil source and the actuating piston and the compensating piston being additonally coupled with each other in the axial direction by connecting means which transfer only tensile forces.

5 Claims, 1 Drawing Sheet

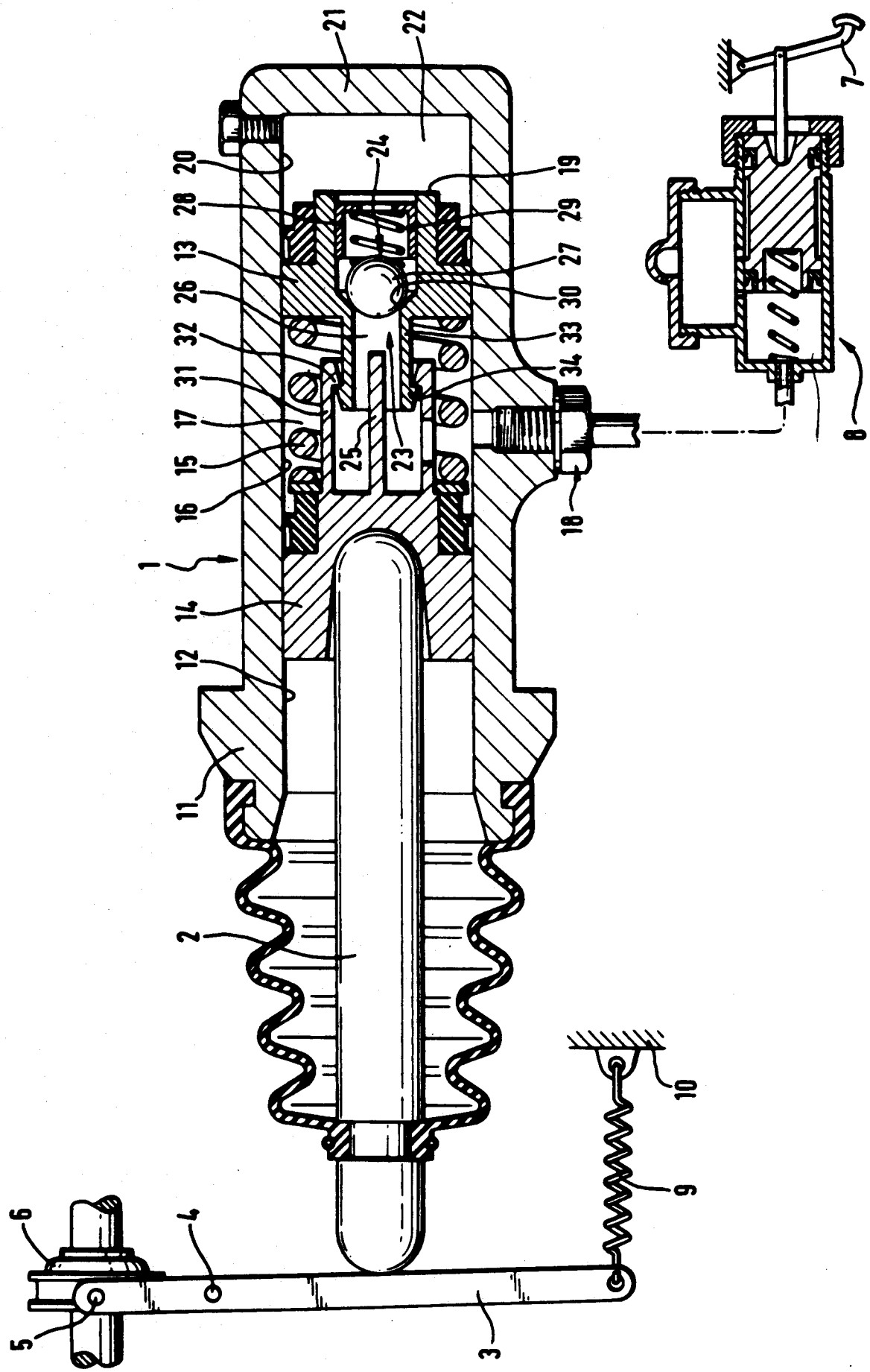

CLUTCH ACTUATING DEVICE

STATE OF THE ART

A clutch actuating device in which an actuating piston coupled via actuating members with a clutch release bearing and, at an axial distance to this, compensating piston are longitudinally displaceably guided in a hollow cylindrical housing, which pistons are held at a distance by a pressure spring and together with a section of the cylinder wall delimit an actuating oil chamber connected to an external oil supply is known from DE-OS 3,590,659. Such a clutch actuating device, also designated as a clutch slave cylinder is known, in which the compensating piston is coupled with a clutch control device reacting to fluid pressure whereas an oil passage regulated as a function of the travel of the compensating piston connects the actuating oil chamber to an oil reservoir. When the clutch is actuated, the compensating piston shifts in the direction of the actuating piston and in doing this, closes the oil passage so that the actuating force is transmitted via the oil bolster and in part, via the pressure spring to the actuating piston which in its turn disconnects the clutch via the actuating members and the clutch release bearing. With increasing wear of the clutch facings, the initial position of the actuating piston is displaced in the direction of the compensating piston whereby the distance between compensating and actuating piston is shortened. The superfluous oil in the thus diminished actuating oil chamber escapes via the oil passage, which is open in the unactuated state of the clutch, into the oil reservoir.

An advantage of this invention is the fact that both, the piston stroke of both pistons as well as the initial and final positions of the compensating piston remain constant throughout the life of the clutch and this, independently of the wear of the facings. However, the fact that with increasing shortening of the distance between compensating and actuating piston, the pressure spring gets compressed has a detrimental effect. The pressure force increased as a result of this acts on the actuating piston similarly to a clutch actuation so that in the extreme case, even with a non-actuated clutch pedal and a highly compressed pressure spring, the clutch no longer locks. In practice, it is not possible to manufacture a pressure spring inexpensively in such a way that on the one hand it exerts sufficient pretensioning force on the actuating piston when the friction linings are new and on the other, that its spring force does not or only slightly increases even when the spring length is shortened.

OBJECTS OF THE INVENTION

It is an object of the invention to design a clutch actuating device so that the pretensioning force of the pressure spring acting on the actuating piston remains almost constant throughout the life of the clutch.

This and other objects and advantages of the invention will become obvious from the following detailed description.

IN THE INVENTION

The clutch actuating device of the invention in which an actuating piston coupled via actuating members with a clutch release bearing and, at an axial distance to this, a compensating piston are longitudinally displaceably guided in a hollow cylindrical housing, which pistons are held at a distance by a pressure spring and together with a section of the cylinder wall of the housing delimit an actuating oil chamber connected to an external oil reservoir, is characterized in that the compensating piston with its side opposed to the actuating piston delimits a compensating oil chamber formed by the bore wall and the housing bottom, the actuating oil chamber and the compensating oil chamber being connected by an oil passage which is regulated both as a function of the distance between the pistons and of the operational state, the actuating oil chamber being connected with a pressure oil source and the actuating piston and the compensating piston being additionally coupled with each other in the axial direction by connecting means which transfer only tensile forces.

In such a clutch actuating device, the actuating oil chamber is connected to a source of fluid pressure operated by the clutch pedal and the compensating piston closes a compensating oil chamber formed by a part of the cylinder wall and a bottom of the housing, the compensating and actuating oil chambers being connected with each other by an oil passage regulated as a function of both the distance between the pistons and the state of actuation, the actuating piston and the compensating piston being additionally coupled with each other in the axial direction by connecting means which transfer only tensile forces.

The regulation of the oil passage is suitably done so that the oil passage is open both when the clutch is actuated and when a certain piston distance is not reached, whereas in all other operational states, the oil passage closes. By this, it is obtained that the pressure spring is supported on a compensating piston entrained at a constant distance from the actuating piston and therefore does not undergo essential changes in length during its operational life.

An advantageous development of the invention provides that the oil passage in the form of a one-way valve with axial canals is arranged in the compensating piston itself, the one-way valve automatically stopping the flow from the compensating oil chamber to the actuating oil chamber, whereas if the desired distance between the pistons is not reached, a tracer cooperating with the actuating piston opens this one-way valve against its closing direction. This tracer can be in the form of a pin fixed to the actuating piston, which pin projects into the suction-side valve canal and acts directly on the valve body.

One embodiment of the mechanical connecting means between actuating and compensating piston comprises a coaxial sleeve fixed to the side of the actuating piston facing the compensating piston, which sleeve at its end facing the compensating piston has a radially inwards directed flange and engages around a sleeve of smaller diameter fixed to the compensating piston, which sleeve in its turn at its end facing the actuating piston has a radially outwards directed flange which overlaps in axial direction with the radially inwards directed flange of the first sleeve.

Referring now to the drawing:

The FIGURE is a longitudinal cross-section of one embodiment of the clutch actuating device of the invention.

In the FIGURE the clutch actuating device 1 of the invention is represented with the schematic out-of-scale adjoining construction. The clutch actuating device 1 acts via the piston rod 2 on the release lever 3 which is pivotably fixed in the bearing 4 and actuates the clutch release bearing 6 via a sliding sleeve 5. With a non-actuated clutch pedal 7, the fluid pressure source 8 in which a compensator reservoir is integrated becomes pressureless and the restoring spring 9 which is mounted between the release lever 3 and the only roughly indicated carrying construction 10, pulls the clutch release bearing 6 back into its initial position. The clutch actuating device 1 comprises a hollow cylindrical housing 11 in whose bore 12, the compensating piston 13 and the actuating piston 14 against which the piston rod 2 bears are longitudinally displaceably guided. The pistons 13, 14 are held at a distance to each other by a pressure spring 15 and delimit together with the bore wall section 16, the actuating oil chamber 17 which is connected via the connecting piece 18 to the pressure fluid source 8.

The compensating piston 13 with its side 19 opposed to the actuating piston 14 delimits the compensating oil chamber 22 formed by the bore wall section 20 and the housing bottom 21. The actuating oil chamber 17 and the compensating oil chamber 22 are connected by an oil passage 23 which is regulated as a function of the operational state of the clutch actuating device 1 and of the distance between the pistons 13, 14. This oil passage 23 is formed by the one-way valve 24 which automatically stops the oil flow from the compensating oil chamber 22 to the actuating oil chamber 17, whereas in the opposite direction of flow, it opens. If the distance between actuating piston 14 and compensating piston 13 falls short of a desired value, the one-way valve 24 is opened against its closing direction by the tracer 25 attached to the actuating piston 14 in that the tracer 25 acts on the valve body 27 through the suction canal 26, pressing it out of the valve seat 30 against the action of the closing spring 29 retained in the bushing 28.

The coupling together of actuating piston 14 and compensating piston 13 is accomplished in this embodiment by the sleeve 31 attached to the actuating piston 14 and pointing towards the compensating piston 13 which sleeve 31 at its end facing the compensating piston 13 has a radially inwards directed flange 32 and engages over a second sleeve 33 which is smaller in diameter and joined to the compensating piston 13. The sleeve 33 in its turn at its end facing the actuating piston 14 has a radially outwards directed flange 34 which overlaps the radially inwards directed flange 32 of the first sleeve 31 in the axial direction. For assembling this connection, the sleeve 33 fixed to the compensating piston 13 is inserted under elastic deformation of the flange 34 into the, if necessary, slit sleeve 31 at the actuating piston 14. This connection transfers only tensile forces whereas if axial compressive forces occur, the sleeves 31, 33 are displaced in each other by sliding.

When the clutch pedal 7 is actuated, the pressure fluid source 8 supplies the compensating oil chamber 22 and the actuating oil chamber 17 in like manner with pressure oil. Under the action of the oil pressure, the actuating piston 14 is moved in the direction of actuation of the clutch and via the connecting means 31, 32, 33, 34 entrains the compensating piston 13. During this time, the one-way valve 24 is open. Consequently, at actuation of the clutch, the distance between the pistons 13, 14 is maintained. With a non-actuated clutch pedal 7, the pressure fluid source 8 is pressureless and the actuating piston 13 is therefore pushed back towards the compensating piston 14 by the action of the restoring spring 9, oil escaping out of the actuating oil chamber 17 through the connecting piece 18. In this condition, the oil pressure in the actuating oil chamber 17 is less than in the compensating oil chamber 22 and the one-way valve is therefore closed so that the compensating piston 13 is retained in its position by the oil contained in the compensating oil chamber 22. IF, at further sinking of the actuating piston 14, the distance between the pistons falls short of the pre-fixed value, the tracer 25 opens the one-way 24 whereby oil escapes from the compensating oil chamber 22 and the compensating piston 13, under the action of the pressure spring 15 sinks in the direction of the housing bottom 21 until the desired distance is re-attained and the one-way valve 24 closes. This process is repeated till the actuating piston 14 has returned to the initial position.

By this arrangement, it is therefore achieved that the distance between the pistons 13 and 14 remains almost constant throughout the life of the clutch actuating device 1 and consequently the spring force on the actuating piston 14 and as a result, on the clutch release bearing 6 does not increase.

The embodiment shown represents only a design which appears to be favorable at the time. Embodiments are by all means conceivable in which the oil passage is designed as a regulated by-pass arranged in the housing and controlled e.g. electrically or electronically by sensors fixed to the pistons. Moreover, different forms of valves and connecting means working in the same manner can be employed.

Various modifications of the device of the invention may be made without departing from the spirit or scope thereof and it is to be understood that the invention is intended to be limited only as defined in the appended claims.

What I claim is:

1. A clutch actuating device in which an actuating piston coupled via actuating members with a clutch release bearing and, at an axial distance to the actuating piston, a compensating piston are longitundinally displaceably guided in a hollow cylindrical housing with a bottom, which pistons are held at a distance by a pressure spring and together with a section of a cylinder wall of the housing delimit an actuating oil chamber connected to an external oil reservoir, the pressure spring being arranged between actuating piston and compensating piston and pre-tensioning the actuating piston in the direction of clutch actuation, characterized in that the compensating piston with its side opposed to the actuating piston delimits a compensating oil chamber formed by an inner wall of the hollow housing and the bottom of the housing, the actuating oil chamber and the compensating oil chamber being connected by an oil passage which is regulated both as a function of the distance between the pistons and of an operation of the clutch actuating device so that the length of the pressure spring does not change, or changes only slightly throughout the life of the clutch, the actuating oil chamber being connected with a pressure oil source and the actuating piston and the compensating piston being additionally coupled with each other in axial direction by connecting means which transfer only tensile forces.

2. A clutch actuating device of claim 1 wherein the oil passage opens either when the clutch is actuated or when, with a non-actuated clutch, the distance between actuating piston and compensating piston falls short of a desired value.

3. A clutch actuating device of claim 2 wherein a one-way valve with closing direction which is provided with a axially extending canal and arranged in the compensating piston forms the oil passage for flow from the compensating oil chamber into the actuating oil chamber.

4. A clutch actuating device of claim 3 wherein a tracer fixed to the actuating piston and pointing towards the compensating piston opens the one-way valve when the distance between the pistons falls short of a desired value.

5. A clutch actuating device of claim 1 wherein a first coaxial sleeve pointing towards the compensating piston is provided at the actuating piston, which sleeve at its end facing the compensating piston has a radially inwards directed flange and engages around a second sleeve which is smaller in diameter and fixed to the compensating piston, which sleeve in at its end facing the actuating piston has a radially outwards directed flange which overlaps the flange of the first sleeve in the axial direction.

* * * * *